United States Patent
Brown et al.

(10) Patent No.: US 9,531,805 B1
(45) Date of Patent: Dec. 27, 2016

(54) SYSTEMS AND METHODS FOR RUN TIME MIGRATION

(71) Applicant: Google Inc., Mountain View, CA (US)

(72) Inventors: Ryan Brown, Mountain View, CA (US); Nathan N. White, Mountain View, CA (US)

(73) Assignee: Google Inc., Mountain View, CA (US)

( * ) Notice: Subject to any disclaimer, the term of this patent is extended or adjusted under 35 U.S.C. 154(b) by 573 days.

(21) Appl. No.: 13/920,967

(22) Filed: Jun. 18, 2013

Related U.S. Application Data

(60) Provisional application No. 61/661,685, filed on Jun. 19, 2012.

(51) Int. Cl.
*H04L 29/08* (2006.01)

(52) U.S. Cl.
CPC ................................. *H04L 67/1091* (2013.01)

(58) Field of Classification Search
CPC .................................................. H04L 67/1091
USPC .......................................................... 709/203
See application file for complete search history.

(56) References Cited

U.S. PATENT DOCUMENTS

| | | | | |
|---|---|---|---|---|
| 6,795,966 B1* | 9/2004 | Lim | ..................... | G06F 11/1438 718/1 |
| 2002/0065876 A1* | 5/2002 | Chien | ................... | G06F 21/126 709/203 |
| 2007/0153691 A1* | 7/2007 | Halpern | ................ | G06F 9/4843 370/230 |
| 2009/0158260 A1* | 6/2009 | Moon | ..................... | G06F 21/53 717/133 |
| 2010/0169537 A1* | 7/2010 | Nelson | ................ | G06F 9/45558 711/6 |

\* cited by examiner

*Primary Examiner* — Brendan Higa
*Assistant Examiner* — Leon Y Tseng
(74) *Attorney, Agent, or Firm* — Lerner, David, Littenberg, Krumholz & Mentlik, LLP

(57) ABSTRACT

A method, system, and non-transitory computer readable medium for safely and efficiently migrating applications from one application server to another is provided. A termination request is received. When an API call has been sent by a first application since a last recurring checkpoint, the sent API call is processed one of several ways. Sometimes the API call is immediately terminated. Alternatively, the first application server waits a waiting period for an answer to the API call, and during the waiting period any new API calls are captured and not sent. Upon completion of the waiting period, if no answer has been returned, the API call is terminated. Then a new checkpoint of the application is taken in order to obtain a new checkpoint data set. The application is then migrated to another application server using the new checkpoint data set.

20 Claims, 9 Drawing Sheets

Application Master
System 150

SYSTEMS AND METHODS FOR RUN TIME MIGRATION

PRIORITY

The present application claims priority to U.S. Provisional Patent Application Ser. No. 61/661,685, filed Jun. 19, 2012, the entire disclosure of which is hereby incorporated by reference.

TECHNICAL FIELD

The disclosed embodiments relate generally to methods and systems, sometimes called application servers, for hosting and executing large numbers of heterogeneous applications including copying and moving applications from one server to another.

BACKGROUND

In general, increases in an application's popularity could present a variety of scalability problems that negatively impact a user's experience. For example, users could experience slower response times, slower page loading, and increased time outs on page requests. These scalability problems are typically alleviated by allocating additional capacity to the application such as more storage, more memory, more CPUs, and more machines in general.

Allocating or installing more computing capacity may be a reasonable solution when increases in an application's popularity are experienced over a prolonged period of time, or when usage of the application is predictable. Similarly, when an application experiences a decrease in usage, removing computing capacity previously allocated to the application may be a reasonable solution, especially when this is experienced over a prolonged period of time, or when the decrease is predictable. However, the popularity of an application is often unpredictable, due to a variety of factors (e.g., time of day, current events, advertising, trends, etc.), and fluctuates to a large extent, which creates load spikes and dips in the application execution or hosting system.

Predefined allocations of computing resources are inefficient solutions for handling temporary load spikes and dips. Increasing or installing more computing resources to handle a load spike is inefficient, since the additional pre-allocated resources go unused when the spike disappears (e.g., when the spike in demand subsides, or the application's popularity dips). Similarly, decreasing computing resources allocated to an application when its popularity declines is also inefficient, since future usage spikes will require the re-allocation of previously removed resources back to the application.

To complicate matters further, application systems may host a large number of heterogeneous applications, each with its own set of fluctuating resource requirements. Pre-allocation of resources, for the reasons discussed above, is often an inefficient solution for ensuring consistent positive user experiences among heterogeneous applications hosted on an application system.

Furthermore, long running applications may need to be moved from one server to another due to fluctuating demand, machine fatigue, and/or other factors. Moving an application from one server to another can cause errors if the application is moved at an inopportune time. For example, it may not be advantageous to move an application when an answer has not yet been returned for an outstanding API call. Determining a good time to move an application from a first server to a second server in order to resume the application in the same state in which it was checkpointed is thus desirable.

SUMMARY

The present disclosure overcomes the limitations and disadvantages described above by providing methods, systems, and non-transitory computer readable storage mediums for managing and moving applications on an application execution system having a plurality of application servers.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide a method of managing and moving applications on an application execution system having a plurality of application servers. The method is performed on a first application server in the plurality of application servers having one or more processors, memory storing an API interface module and an application. The application is checkpointed on a recurring basis over time (e.g. periodically). The migration process begins when a termination request is received. The first application server determines whether an API call has been sent by the application since the last checkpoint. When no API call has been sent since the last checkpoint, the API interface module uses the data set associated with the last checkpoint to migrate the application to another application server in the application execution system. When an API call has been sent by the application since the last checkpoint of the application, the sent API call is processed in one of several ways. In some embodiments, the API call is immediately terminated. In other embodiments, the first application server waits a waiting period for an answer to the API call and, during the waiting period, any new API calls are captured and not sent. Upon completion of the waiting period, either an answer has been received or not. If no answer has been returned, the API call is terminated. Then a new checkpoint of the application is taken in order to obtain a new checkpoint data set. Depending on the situation, this new checkpoint data will include one or more of the following: identity information for a terminated API call, any answers to API calls received since the last checkpoint, and any captured and unsent new API calls. The new checkpoint data set is then used to migrate the application to another application server in the application execution system.

Some other embodiments provide an application execution system having a plurality of application servers. A first application server in the plurality of application servers has one or more processors and memory storing an API interface module and an application. The application on the first application server is checkpointed on a recurring basis over time (e.g. periodically). The API interface module on the first application server includes instructions for performing the following. A termination request is received. The first application server determines whether an API call has been sent by the application since the last checkpoint. When no API call has been sent since the last checkpoint, the API interface module uses the data set associated with the last checkpoint to migrate the application to another application server in the application execution system. When an API call has been sent by the application since the last checkpoint of the application, the sent API call is processed one of several ways. In some embodiments, the API call is immediately terminated. In other embodiments, the first application server waits a waiting period for an answer to the API call, and during the waiting period it captures and does not send any new API calls. Upon completion of the waiting period, either the answer has been returned or not. If no answer has been returned, the API call is terminated. Then a new checkpoint of the application is taken in order to obtain a new checkpoint data set. Depending on the embodiment, this new checkpoint data will include one or more of the following: identity information for a terminated API call, any answers to API calls received since the last checkpoint, and any captured and unsent new API calls. The new checkpoint data set is then used to migrate the application to another application server in the application execution system.

Yet other embodiments provide a non-transitory computer readable storage medium storing an API interface module and an application to be executed by one or more processors of an application server in a system having a plurality of application servers. The application on the first application server is checkpointed on a recurring basis (e.g. periodically). The API interface module on the first application server includes instructions for performing the following. A termination request is received. The first application server determines whether an API call has been sent by the application since the last checkpoint. When no API call has been sent since the last checkpoint, the API interface module uses the data set associated with the last checkpoint to migrate the application to another application server in the application execution system. When an API call has been sent by the application since the last checkpoint of the application, the sent API call is processed one of several ways. In some embodiments, the API call is immediately terminated. In other embodiments, the first application server waits a waiting period for an answer to the API call, and during the waiting period it captures and does not send any new API calls. Upon completion of the waiting period, either the answer has been returned or not If no answer has been returned the API call is terminated. Then a new checkpoint of the application is taken in order to obtain a new checkpoint data set. Depending on the embodiment, this new checkpoint data will include one or more of the following: identity information for a terminated API call, any answers to API calls received since the last checkpoint, and any captured and unsent new API calls. The new checkpoint data set is then used to migrate the application to another application server in the application execution system.

These methods, systems, and non-transitory computer readable storage mediums provide new, more efficient ways for an application in an application execution system to be moved from one server to another such that, when moved to the new server, the application can immediately be restored to a state that application was in when it was terminated on the originating application server. Since, moving an application from one server to another can cause errors if the application is moved at an inopportune time, it is desirable to determine a good time to terminate, move, and then resume the application. The description below provides detailed descriptions of various embodiments and mechanisms for determining when and how an application will be advantageously moved from one application server to another.

BRIEF DESCRIPTION OF THE DRAWINGS

Like reference numerals refer to corresponding parts throughout the drawings.

DESCRIPTION OF EMBODIMENTS

Figure 1:
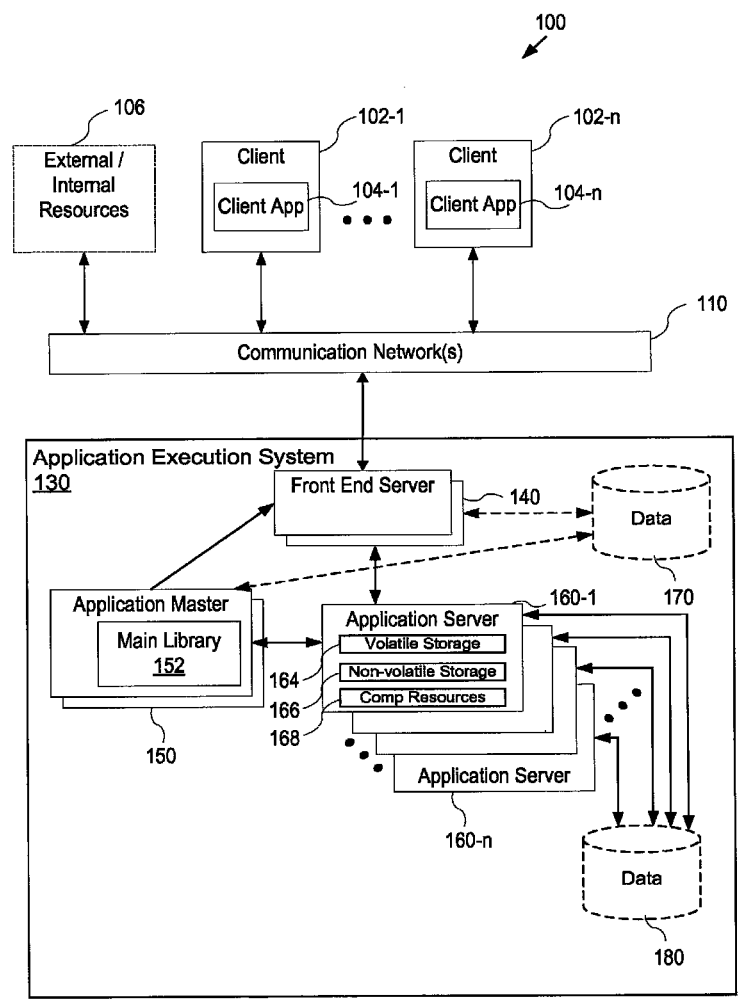
FIG. 1 is a block diagram of a distributed computing system including an application execution system according to certain embodiments.

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present various embodiments may be practiced without these specific details. In other instances, well-known methods, procedures, components, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to," depending on the context. Similarly, the phrase "if it is determined" or "if (a stated condition or event]) is detected" may be construed to mean "upon determining" or "in response to determining" or "upon detecting (the stated condition or event)" or "in response to detecting (the stated condition or event)," depending on the context.

Applications, especially long running applications that may run for more than a day, may need to be moved from one server to another due to fluctuating demand, machine fatigue, and/or other factors. In order to avoid server failure one option is to move applications from one server to another. Another option is to predict when a server is likely to fail, and then move the long running applications before the server fails. For example, run times may vary from one server to another. In some instances, applications are monitored. When an instance of an application is performing slower than average for that application, or slower than desired, the application may be a candidate to be moved to another application server. Moving an application from one server to another can cause errors if the application is moved at an inopportune time. For example, it may not be advantageous to move an application when an answer has not yet been returned for an outstanding API call. Thus, in some embodiments, it is desirable to determine if an API call has been sent by an application since a last checkpoint of the application. Furthermore, it may not be advantageous to move an application that has an outstanding state-changing API call, whereas moving an application that has an outstanding non-state-changing API call (but not outstanding state-changing API calls) may be less problematic. Thus, in some embodiments, the type of outstanding API call is determined as a part of the process of moving the application from one server to another. Determining a good time to pause, serialize, move, an application from a first server to another server is thus desirable.

FIG. 1 is a block diagram of a distributed computing system 100 including an application execution system 130 connected to a plurality of clients 102 (e.g. 102-1 . . . 102-*n*) through a network 110 such as the Internet, other wide area networks, local area networks, metropolitan area networks, wireless networks, or any combination of such networks. In some embodiments, a respective client 102 contains one or more client applications 104 (e.g. 104-1 . . . 104-*n*), such as a web browser, for submitting application execution requests to the application execution system 130. The client 102 (sometimes called the "client device" or "client computer") may be any computer or similar device through which a user of the client 102 can submit requests to and receive results or services from the application execution system 130. Examples include, without limitation, desktop computers, notebook computers, tablet computers, mobile devices such as mobile phones, personal digital assistants, set-top boxes, or any combination of the above.

In some embodiments, the application execution system 130 includes one or more front-end servers 140. The front-end server 140 receives application execution requests from clients 102 and returns results to the requesting clients.

The application execution system 130 also includes a plurality of application servers 160 (e.g., 160-1 through 160-*n*). Each of the application servers 160 includes volatile storage 164 for executing one or more applications, non-volatile storage 166 for storing one or more applications, and computational resources 168 for executing applications in response to requests received by the application execution system 130. In some embodiments, a long running application will be moved from a first application server 160-1 to another application server 106-*n*. This may occur for example because the first application server 160-1 is taken down for maintenance or is expected to malfunction.

In some embodiments, the application execution system 130 also includes an application master 150 that distributes applications, from a main library 152 having a plurality of applications, among the application servers 160. In some embodiments, the application master 150 communicates with data store 170 which includes information about which application servers accept service requests for a particular application.

In some embodiments, the application execution system 130 includes data store 180 that is accessible to each of the application servers 160, for storing applications, including applications that are checkpointed in order to be moved from one application server to another. It will be appreciated that data store 180 and date store 170 may, in fact, be the same physical data store. However, they are illustrated as different physical data stores in FIG. 1 to emphasize the different roles that they play, and to illustrate that the application master 150 does not require access to the checkpointed applications being moved in some embodiments of the present disclosure.

In the embodiment shown in FIG. 1, the main library 152 is stored in the application master 150. In some embodiments, each application of the plurality of applications in the main library 152 is a web application that is responsive to HTTP requests. However, the present invention can also be used in non-web based environments, in which case the applications need not be web-based applications.

Optionally, the distributed system 100 includes additional resources 106, which may be located either internally or externally to the system 100, for use when executing applications in the application execution system 130. For example, an application executed by the application execution system 130 may access information in one or more of the additional resources 106 in order to process a request received from a respective client 102.

Figure 2A:
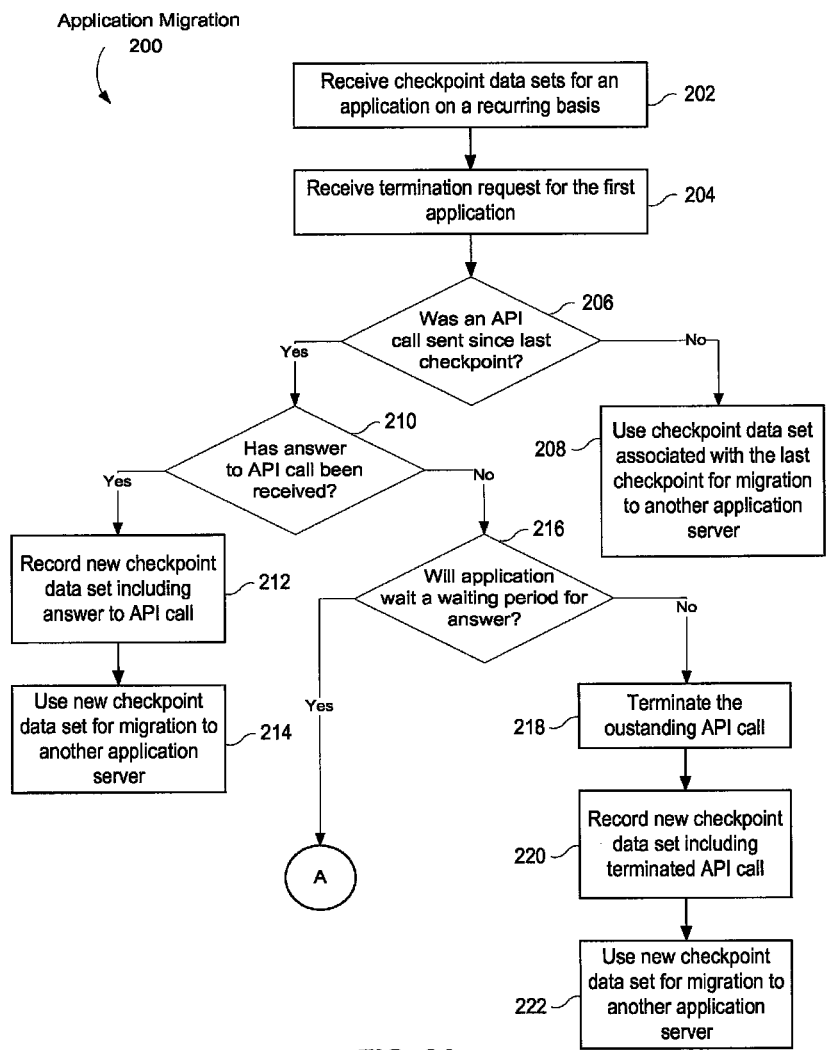
FIG. 2A is a flow diagram illustrating a method, performed by an application server, of managing and moving an application on an application execution system, according to certain embodiments.
Figure 2B:
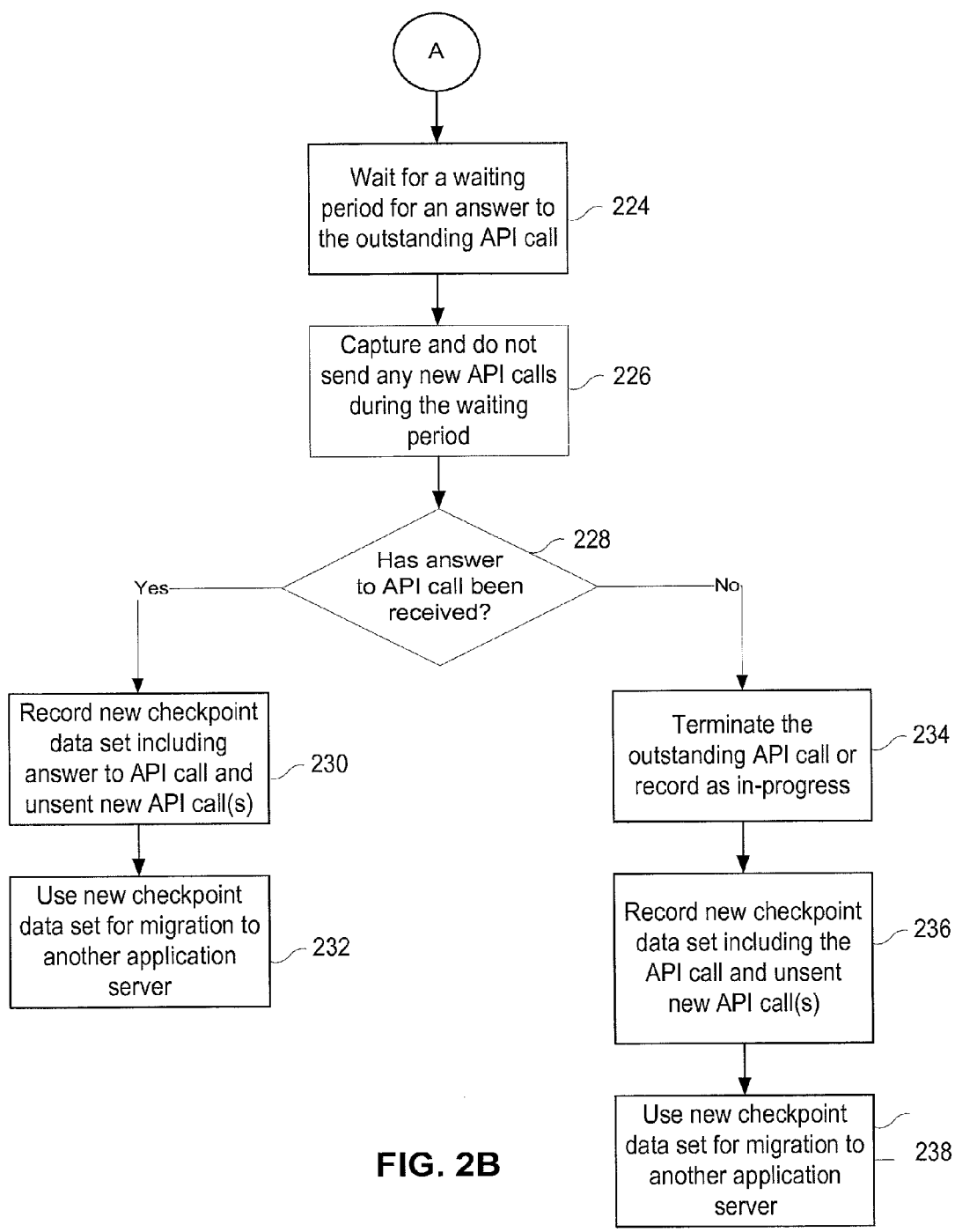
FIG. 2B is a flow diagram continuing to illustrate a method, performed by an application server, of managing and moving an application on an application execution, according to certain embodiments.

FIGS. 2A and 2B are flow diagrams illustrating an application migration method 200, performed by an application server of an application execution system comprising a plurality of application servers. The method involves moving/migrating, an application from an originating application server (e.g., a first application server 160-1 of FIG. 1) to a destination application server (e.g. application server 160-*n* of FIG. 1). An application server has one or more processors and memory storing an application to be executed by the one or more processors as well an API interface module which is utilized in performing the following processes associated with migration. The API interface module comprises one or more programs stored in the memory of the application server for performing various aspects of these processes, as explained in more detail with respect to FIG. 6.

In some embodiments, the application is checkpointed on a recurring (e.g., periodic) basis (202). Each checkpoint derives a checkpoint data set. In some embodiments, the checkpointing is performed in time-based periods (e.g., every 30 seconds, every 1 minute, every two minutes, every 5 minutes, every 15 minutes, every 30 minutes, every hour, etc.) In other embodiments, the checkpointing is performed in response to a triggering event (e.g., it is performed when directed to by an application master (150, FIG. 1)). In other embodiments, the checkpointing is performed when a certain number of API calls have been sent (e.g., after every API call, after every 5 API calls, after every 10 API calls, after every 25 API calls, etc.). In other embodiments, the checkpointing is performed when a certain number of API answers have been received (e.g., after every API answer, after every 5 API answers, after every 10 API answers, after every 25 API answers, etc.) In other embodiments, the checkpointing is performed after a certain number of client requests have been processed (e.g., after at least 10 processed client requests, after at least 50 processed client requests, after at least 100 processed client requests, after at least 200 processed client requests, etc.) It is further noted that, in some embodiments, recurring checkpoints are not necessary to perform the process described below. For example, the process described below is utilized in some implementations, after only a single checkpoint, e.g., a checkpoint taken in response to a triggering event.

A termination request is received for the first application (204). In some embodiments, the termination request is received from the application master. In other embodiments, it is received from the front end server. In still other embodiments, it is received from another application server 160-n. Alternatively, it is received from the first application server itself. For example, a self monitoring application server may generate a termination request. In some embodiments, a termination requests is generated or received when indication of failure of the first application or the first application server is obtained or detected. For example, when the application or application server is responding slower than average, or slower than expected, a termination request may be generated or received. In other embodiments, the termination request may be unrelated to any indication of failure. For example, in some embodiments, a termination request is generated or received when the application or application server is being taken down for maintenance, or when the application is being moved according to an application migration protocol. It is noted that, in some embodiments, the termination request is received because of an immediate need to terminate the first application, e.g., in response to a power failure warning. However, in other embodiments, the termination request is not necessarily the result of a "terminal" event. For example, a termination request could be received due to a load balancing process as described herein.

After the termination request for the first application is received (204), the following is performed. The application server determines whether an API call has been sent by the first application since a last checkpoint of the first application (206). In practice, the application server determines whether one or more API calls have been sent. However, for the sake of discussion and for clarity, reference is often made below to a single API call.

As used herein, an API call is any request to a service outside of the application itself. In some embodiments, an API call is handled by the application server hosting the application. That is, the application server hosting the application, or another application running on the application server, processes the API call and provides a result, responsive to the API call, back to the requesting application. In some embodiments, an API call is handled by a device that is addressable by the application server hosting the application, such as a data store or other network component. That is, the API call is sent by the application server hosting the application to the device, typically over a network. The device processes the API call and provides a result, responsive to the API call, back to the application server hosting the application and thereby ultimately back to the application.

One of skill in the art will appreciate that an application is any set of instructions that are processed either directly or in compiled form, at least in part, by a processing unit.

When an API call has not been sent since the last checkpoint (206—no), the checkpoint data set associated with the last checkpoint is used for the migration (208). In some embodiments, the last checkpoint data set is sent to another application server (e.g., 160-n, FIG. 1) in the plurality of application servers. In other embodiments, the last checkpoint data set is sent to shared data store (e.g., 180, FIG. 1) where it can then be accessed by and moved to another application server (e.g., 160-n, FIG. 1). In other embodiments, the last checkpoint data set is sent to the application master (e.g., 150, FIG. 1) where it can then be accessed by and moved to another application server (e.g., 160-n, FIG. 1).

When an API call has been sent since the last checkpoint by the first application (206—yes), the API call is processed as follows. The application server determines whether the API call is still outstanding since the last checkpoint, e.g., the application server determines whether an answer to the API call has been received (210).

When an answer to the API call has been received, e.g., when the API call is not outstanding (210—yes), then a new checkpoint data set including the answer to the API call is recorded (212). In other words, a new checkpoint of the first application is taken in order to obtain a new checkpoint data set (212). In this instance, the new checkpoint data set includes an answer to the sent API call. The new checkpoint data set is then used for the migration (214). In some embodiments, the new checkpoint data set is sent to another application server (e.g., 160-n, FIG. 1) in the plurality of application servers. In other embodiments, the new checkpoint data set is sent to a shared data store (e.g., 180, FIG. 1) where it can then be accessed by and moved to another application server (e.g., 160-n, FIG. 1). In other embodiments, the new checkpoint data set is sent to the application master (e.g., 150, FIG. 1) where it can then be accessed by and moved to another application server (e.g., 160-n, FIG. 1). It is noted that the above described embodiments of where the new checkpoint data is sent are true for each new checkpoint data set described below as well.

When an answer to the API call answer has not been received, e.g. when the API call is outstanding (210—no), the application server determines whether to wait a waiting period for the API call answer (216). It is noted that more than one API call may have been sent and received an answer since the last checkpoint, but for the purposes of the processes described here, which follows the determination of (210—no), at least one API call answer is still outstanding.

In some embodiments, the application server determines whether to wait a waiting period for the API call answer (216) based on the type of outstanding API call. For example, in some embodiments, if the outstanding API call is a state-changing API call (e.g., it is a write, not a read operation) then the application server determines to wait for the answer, or to wait at least a waiting period for the answer. In some embodiments, if the outstanding API call is non-state-changing then the application server determines not to wait a waiting period for the answer. It is noted that in some other embodiments the application server may not wait a waiting period when the application server of the application is eminently expected to fail.

In some embodiments, if the outstanding API call is a state-changing API call (e.g., it is a write, not a read operation) then the application server determines to wait at least a first waiting period for the answer. And, if the outstanding API call is non-state-changing, the application server determines to wait a second period for the answer, where the first waiting period is longer than the second waiting period.

When the application server determines not to wait a waiting period for the API call answer (216—no), then the at least one outstanding API call is terminated (218). Then a new checkpoint data set including the identity information for the terminated API call is recorded (220). In other words, a new checkpoint of the first application is taken in order to obtain a new checkpoint data set (220). In this embodiment, the new checkpoint data set includes at least the identity information for the terminated API call, but it may also include answers to any sent API calls that have been returned since the last checkpoint was recorded. This new checkpoint data set is then used for the migration (222). As described above, for migration, the new checkpoint data set may be sent to the shared data store (e.g., 180, FIG. 1), sent to the application master (e.g., 150, FIG. 1), or sent directly to another application server (e.g., 160-*n*, FIG. 1) in the plurality of application servers depending on the embodiment employed.

When application server determines to wait a waiting period for the API call answer (216—yes), then the process "A" continues as shown in FIG. 2B. The application server waits a waiting period for an answer to the outstanding API call (224). It is noted that in some embodiments the waiting period is: 0.5 to 2 seconds, 2 to 5 seconds, 5 to 10 seconds, 10 to 30 seconds, 30 seconds to 1 minute, 1 to 2 minutes, 3 to 5 minutes, 5 to 15 minutes, 15 to 30 minutes, or 30 minutes to one hour. In other embodiments, the waiting period is determined based how frequently the application has historically made API calls. In some embodiments, the waiting period is determined based on how recently the application was checkpointed. In some embodiments, the waiting period is determined based the health of the application. For example, it the application is expected to die within the next hour, then the waiting period is significantly less than an hour such as for example 10 minutes to half an hour, 5 to 10 minutes, 1 to 5 minutes, or 1 minute or less.

During the waiting period, the application server captures and does not send out any new API calls it receives (226). Upon completion of the waiting period, the application server determines whether the API call has been received (228).

If the API call answer has been received during the waiting period (228—yes), then a new checkpoint data set, including the API call answer, is recorded (230). In other words, a new checkpoint of the first application is taken in order to obtain a new checkpoint data set (230). In this embodiment, the new checkpoint data set includes at least the API call answer. It will also include any API calls that were captured and not sent during the waiting period, and will additionally include answers to any sent API calls that were returned since the last checkpoint was recorded. This new checkpoint data set is used for the migration (232). As described above, the new checkpoint data set may be sent to the shared data store (e.g., 180, FIG. 1), sent to the application master (e.g., 150, FIG. 1), or sent directly to another application server (e.g., 160-*n*, FIG. 1) in the plurality of application servers depending on the embodiment employed.

If the API call answer has been not been received during the waiting period (228—no), then the outstanding API call is terminated or recorded as in-progress (234). Then a new checkpoint data set including the identity information for the API call is recorded (236). In other words, a new checkpoint of the first application is taken in order to obtain a new checkpoint data set (236). In this embodiment, the new checkpoint data set includes at least the identity information for the API call. This new checkpoint data set is used for the migration (238). As described above, the new checkpoint data set may be sent to the shared data store (e.g., 180, FIG. 1), sent to the application master (e.g., 150, FIG. 1), or sent directly to another application server (e.g., 160-*n*, FIG. 1) in the plurality of application servers depending on the embodiment employed. As such, the new checkpoint data set can be termed a "migration checkpoint dataset."

It will be appreciated that a reply to the API call may be received after the migration checkpoint dataset has been migrated to a new migration destination. Some embodiments advantageously make use of this by migrating the reply to the API call to the same destination as the migration checkpoint dataset. In such embodiments, this alleviates the need to rerun the API call at the migration destination. This is particularly useful in instances where the reply is to an API call that took a long time to run but nevertheless was high priority. Thus, in some embodiments, the original server holds onto any response it receives to the API call from the termination application, for a predetermined waiting period, and forwards the reply to the same migration destination as the migration checkpoint dataset. In such embodiments, the response is reconstituted with the migration checkpoint dataset at the migration destination.

In some embodiments, the new server (migration destination) informs the original application server to forward the response to the API call the terminated application made on the original application server. Of course, the migration destination has the option of cancelling the outstanding API call in the migration checkpoint dataset set and rerunning the API call at the migration destination.

One benefit of migrating responses to API calls that are received after the migration checkpoint dataset has been formed in the manner described above is that, when the original application server stabilizes or is not powered off as was expected to happen in some embodiments, the replies to the API calls are not lost and thus there is little or minimal loss in application performance.

The migration checkpoint dataset will include any API calls that were captured and not sent during the waiting period as well as answers to any sent API calls that were returned since the last checkpoint was recorded (e.g., the checkpoint immediately prior to the migration checkpoint dataset).

Figure 3A:
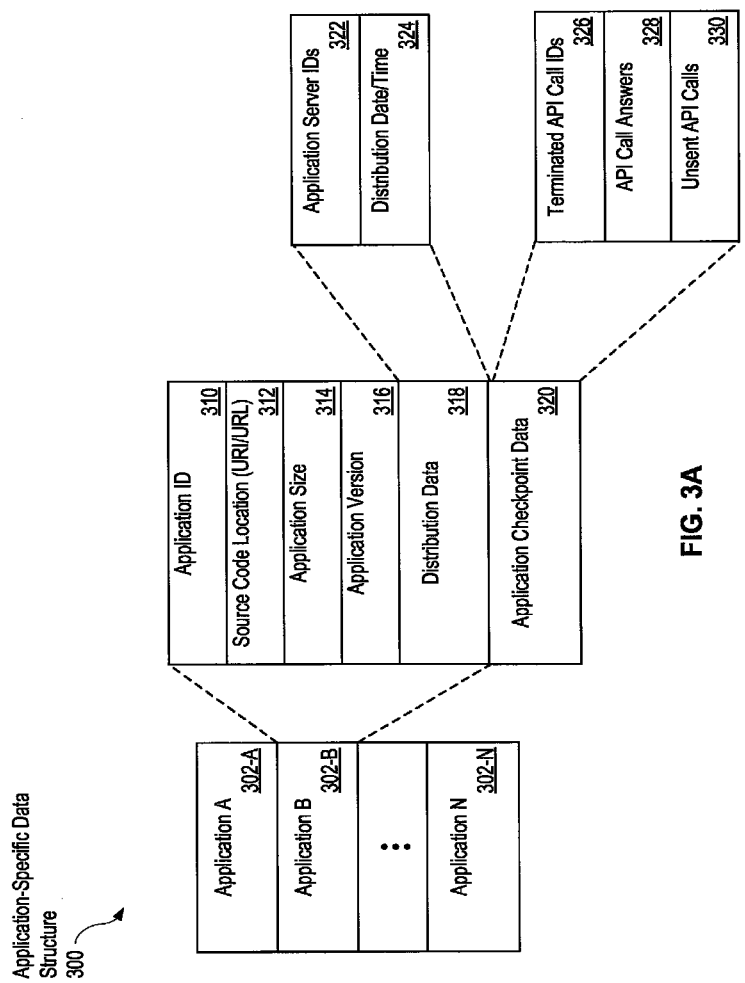
FIG. 3A represents an application-specific data structure, according to certain embodiments.

FIG. 3A represents an application-specific data structure, according to certain embodiments. FIG. 3A is a block diagram of a table or other data structure 300 within data structure 180 (or 170). In some embodiments the data structure 300 stores information about each of the applications in the main library 152. Alternately, the data structure 300 includes information for a subset of the applications, such as active applications that have been distributed to a subset of application servers and/or the applications to be moved from a first application server 160-1 to another application server 160-*n*. The data structure 300 includes a respective record 302 for each application for which information is stored. In some embodiments, the record 302 stores the information specific to the application (e.g., record 302-B for Application B) including:

a unique application identifier (application ID) 310;
    the location of the application's source code (Source Code Location) 312;
    the storage size of the application 314;

a version identifier for the application 316;

distribution data 318 identifying application servers that have a copy of the application in their local libraries, which includes: information identifying the application servers that contain the respective application and are available to service requests for that particular application type (e.g., Application Server IDs) 322; and optionally, dates and times showing when the respective application was distributed to the identified application servers (Distribution Date/Time) 324; and application checkpoint data 320, which includes one or more application checkpoint data sets including: identity information for any terminated API calls, any API call answers, and any captured and unsent API calls.

Figure 3B:
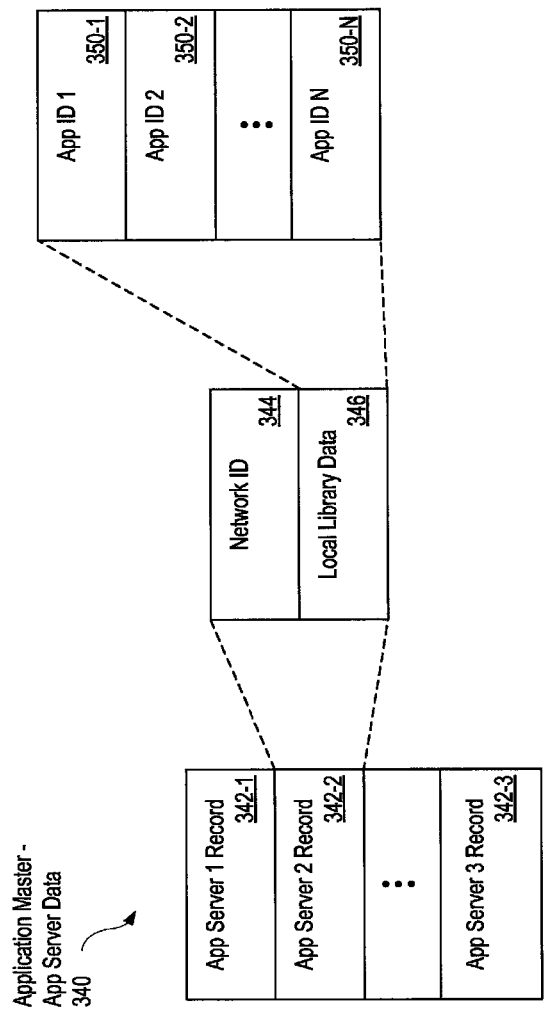
FIG. 3B illustrates a data structure used by an application master to store information concerning a set of application servers to which a set of applications have been distributed, according to certain embodiments.

FIG. 3B illustrates a data structure 340 used by an optional application master 150 to store information concerning a set of application servers 160-1 to 160-n to which a set of applications have been distributed, according to certain embodiments. In some embodiments, the data structure 340 includes information for a subset of the application servers, such as active application servers serviced by the application master. The data structure 340 includes a respective record 342 for each application server for which information is stored. In some embodiments, the record 342 is maintained by the application master 150 and stores the information specific to the application server (e.g., record 342-2 for Application Server 2), including:

a unique identifier 344 (e.g., network ID) for the application server, for example an identifier that indicates or that can be used to find the server's location on the network; and local library data 346 identifying the specific applications installed on the application server's local library.

The local library data 346 includes information (e.g., application identifiers 350) identifying the applications installed on the application server. Optionally, local library data 346 includes additional information, such as distribution date information or version information for the listed applications. The information in the local library data 346 for a respective application server is received from that application server, and may be stored at the application server either as a distinct data structure, or together with the local application library itself, or in combination with other information retained by the application server.

In some embodiments, a single application will be moved from a first application server 160-1 to another application server 160-n. For example, the application may be running slower than its demand on the first application server 160-1, and moving it to another application server 160-n will allow the application to run more quickly. In such embodiments, the data structure 340 is useful in identifying the respective application (e.g. Application ID 350-1) and moving it at an in accordance with the procedures described above. In other embodiments, the entire application server maybe taken off line. In such instances, many if not all of the applications installed on the application server will be moved. In these embodiments, the data structure 340 is useful in identifying each of the applications (350-1 to 350-n) to be moved.

Figure 3C:
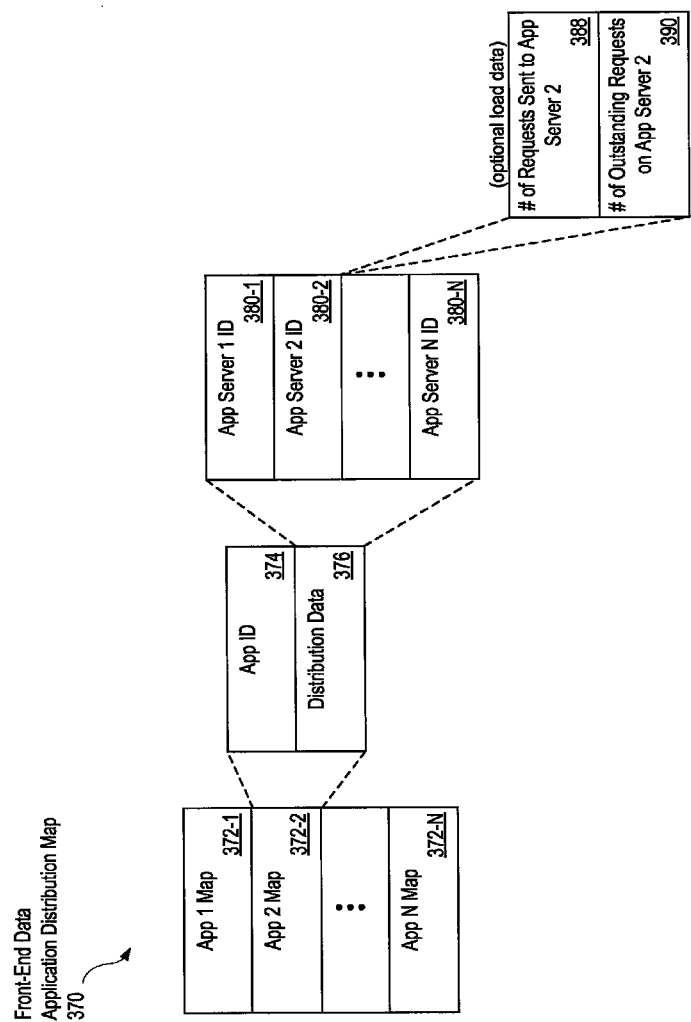
FIG. 3C illustrates a data structure used by a front-end server to route application processing requests to application servers, according to certain embodiments.

FIG. 3C illustrates a data structure 370 used by a front-end server 140 to route application processing requests to application servers 160, according to certain embodiments. In accordance with some embodiments, the data structure(s) 180 contain distribution data identifying which of the application servers 160 will accept service requests for each of a plurality of application types, and the one or more front-end servers 140 of the application execution system 130 route requests to the application servers in accordance with the distribution data. As such, when an application is moved from a first application server 160-1 to another application server 160-n, the data structure 370 can ensure that the application service requests are routed to one of the application servers currently processing requests for that application type. In the example shown in FIG. 3C, the distribution data, and optionally other information that can be used for determining the application server to which a respective application execution request should be routed, is stored in data structure 370.

The data structure 370 stores a respective record 372 for each application to which the front-end 140 may need to route application execution requests. This record 372 may be called an application distribution map. In some embodiments, the record 372 for a respective application includes the following information: an identifier 374 of the application, and distribution data 376 for the application. The distribution data 376 includes a list of identifiers 380 or other information identifying the application servers 160 that currently have a copy of the application in their local libraries and will accept service requests for the application corresponding application type. Optionally, the front end application server may include in the resource data 370 for a particular application server: the number of (application execution) requests 388 that have been sent to the application server over a defined period of time (e.g., the past hour), and/or the number of outstanding (or queued) requests 390 that are pending at the application server. The resource data 370, stored by the front-end for a respective application server may comprise averages or running averages of resource usage by the applications being executed by the respective application server.

In some embodiments, the front-end server 140 receives at least a portion of the application distribution map 370 from the data structure 180 (or in some embodiments from the application master 150), or a cached copy thereof. As noted above, the application distribution map 370 optionally includes resource usage information that can be used to route requests received from client(s) 102. For example, upon receiving a request from a client to execute a specified application, the front-end server 140 accesses the corresponding record 372 (of application distribution map 370) for the specified application, or the cached copy thereof, to determine the application servers that will accept service requests for that application. In some embodiments, the front-end server 140 routes such requests using a round robin methodology (e.g., in round robin order within the list of application servers in the record 372 for the application), or a random assignment methodology (e.g., randomly or pseudo-randomly among the application servers listed in record 372). An example of such a random assignment methodology is a Monte Carlo technique.

In some other embodiments, the front-end server 140 routes requests based on current and historical load information that the front end server has observed directly. Two load metrics that the front-end server 140 can observe directly are the number of application execution requests that the front-end server 140 has recently sent to each application server, and the number of currently outstanding application execution requests at each application server (e.g., the number of recent application execution requests sent to each application server which have yet to return results or a completion signal). It is noted that the number of pending application execution requests (also called currently outstanding application execution requests) is a latency metric, and thus measures performance from the perspective of the system's users. Using this information, which may be observed and stored by the front-end server 140, the front end server 140 may route application requests. For example, the front-end server 140 may route a request to the application server that (A) will accept service requests for the requested application, and (B) has the least number of outstanding requests. In another example, the front-end server 140 may route a request to the application server that (A) will accept service requests for the requested application, and (B) has the least number of outstanding requests for the requested application.

Figure 4:
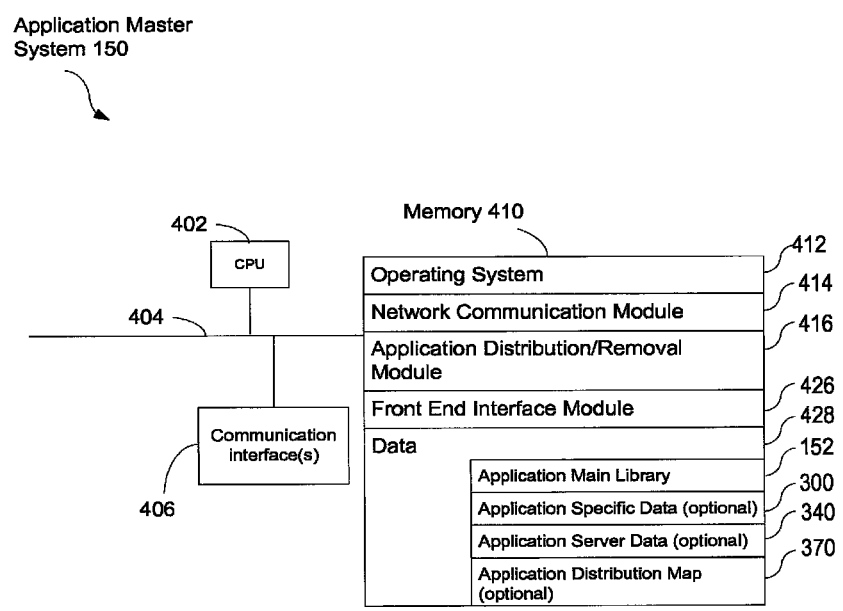
FIG. 4 is a block diagram of an application master in accordance with some embodiments.

FIG. 4 is a block diagram of an (optional) application master 150, which may be implemented using one or more servers. For convenience, the application master 150 is herein described as implemented using a single server or other computer. The application master 150 generally includes one or more processing units (CPU's) 402, one or more network or other communications interfaces 406, memory 410, and one or more communication buses 404 for interconnecting these components. The communication buses 404 may include circuitry (sometimes called a chipset) that interconnects and controls communications between system components. Memory 410 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may include mass storage (e.g., data structure(s) 180 of FIG. 1) that is remotely located from the central processing unit(s) 402. Memory 410, or alternately the non-volatile memory device(s) within memory 410, includes a non-transitory computer readable storage medium. In some embodiments, memory 410 or the computer readable storage medium of memory 410 stores the following programs, modules and data structures, or a subset thereof:

- an operating system 412 that includes procedures for handling various basic system services and for performing hardware dependent tasks;
- a network communication module 414 that is used for connecting the application master 150 to other computers via the one or more communication network interfaces 406 (wired or wireless) and one or more communication networks, such as the Internet, other wide area networks, local area networks, metropolitan area networks, and the like;
- an application distribution/removal module 416 that is used in some embodiments for distributing respective applications from the main library 152 (FIG. 1) to the application servers 160 for storage in non-volatile storage of the application servers either before; the application distribution/removal module 416 also optionally includes instructions for removing and moving previously distributed applications from the non-volatile storage of respective application servers in accordance with the methods disclosed herein;
- a front end interface module 426 that is used for interfacing with the front end servers 140 (FIG. 1); and
- data 428, which includes the main library data 152, and optionally includes application specific data 300, application server data 340, and/or the application distribution map 370 disclosed in detail herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Figure 5:
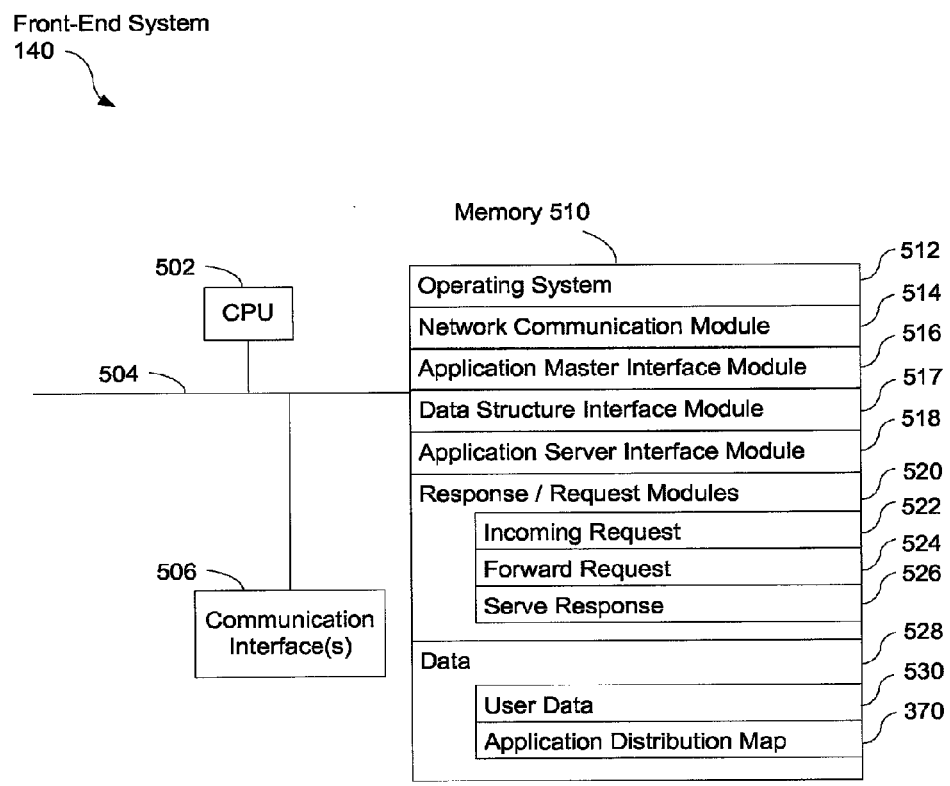
FIG. 5 is a block diagram of a front-end system in accordance with some embodiments.

FIG. 5 is a block diagram of a front-end system 140, which may implemented using one or more servers. For convenience, the front-end system 140 is herein described as implemented using a single server or other computer. The front-end system 140 generally includes one or more processing units (CPU's) 502, one or more network or other communications interfaces 506, memory 510, and one or more communication buses 504 for interconnecting these components. The communication buses 504 may include circuitry (sometimes called a chipset) that interconnects and controls communications between system components. Memory 510 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may include mass storage (e.g., data store 170, data store 180 of FIG. 1) that is remotely located from the central processing unit(s) 502. Memory 510, or alternately the non-volatile memory device(s) within memory 510, includes a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a network communication module 514 that is used for connecting the front-end server 140 to other computers via the one or more communication network interfaces 506 (wired or wireless) and one or more communication networks, such as the Internet, other wide area networks, local area networks, metropolitan area networks, and the like;
- an (optional) application master interface module 516 that is used for interfacing with the (optional) application master 150 (FIG. 1);
- a data structure interface module 517 used for interfacing with data structure(s) 180;
- an application server interface module 518 that is used for interfacing with the application servers 160-1 to 160-n (FIG. 1);
- response and request modules 520 for handling incoming client 102 requests for applications. In some embodiments, the response and request modules 520 include procedures for receiving incoming requests (e.g., Incoming HTTP Request) 522 and for forwarding the HTTP request to an application server 160 (FIG. 1) that is currently hosting a copy of the requested application and is actively accepting service requests for the requested application (Forward HTTP Request) 524. The response and request modules 520 may also include procedures for serving responses from the application servers 160 to the clients 102 (Serve HTTP Response) 626.
- data 528 which includes user data 530 and the application distribution map 370. In some embodiments, the user data 530 include client-specific information passed to the front-end 140 by the client 102 (e.g., parameters embedded in the HTTP request). The application distribution map 370 includes information used by the front-end to route application processing requests to application servers as described with respect to FIG. 3C.

Each of the above identified elements may be stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Figure 6:
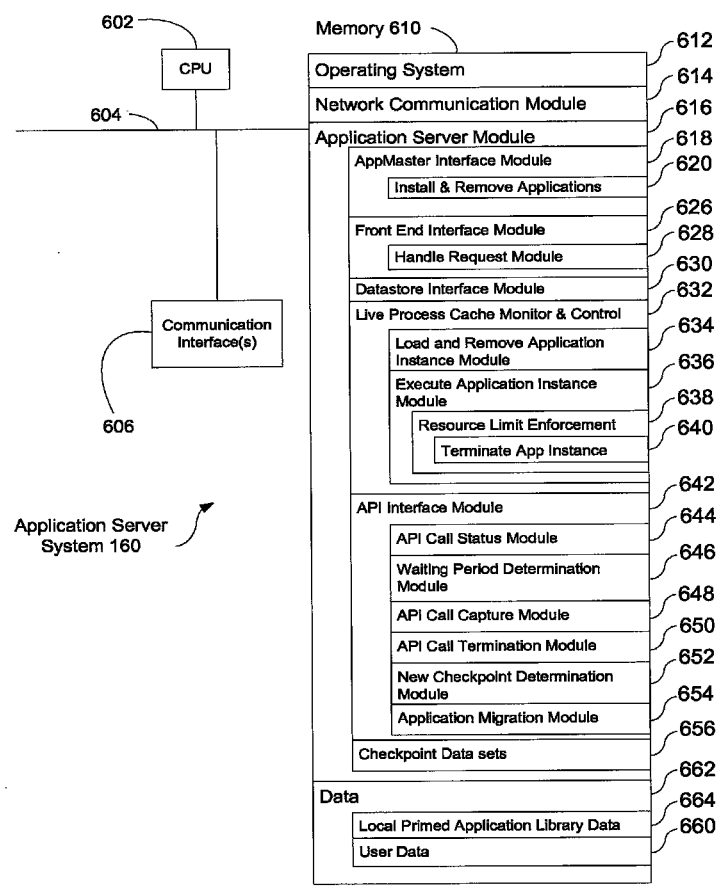
FIG. 6 is a block diagram of an application server in accordance with some embodiments.

FIG. 6 is a block diagram of an application server 160 in accordance with some embodiments, which may implemented using one or more servers. For convenience, the application server 160 is herein described as implemented using a single server or other computer. The application server 160 generally includes one or more processing units (CPU's) 602, one or more network or other communications interfaces 606, memory 610, and one or more communication buses 604 for interconnecting these components. The communication buses 604 may include circuitry (sometimes called a chipset) that interconnects and controls communications between system components. Memory 610 may include high speed random access memory such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 610 may include mass storage (e.g., data store 170, data store 180, of FIG. 1) that is remotely located from the central processing unit(s) 602. Memory 610, or alternately the non-volatile memory device(s) within memory 610, includes a non-transitory computer readable storage medium. In some embodiments, memory 610 or the computer readable storage medium of memory stores the following programs, modules and data structures, or a subset thereof:

- an operating system 612 that includes procedures for handling various basic system services and for performing hardware dependent tasks;
- a network communication module 614 that is used for connecting the application server 160 to other computers via the one or more communication network interfaces 606 (wired or wireless) and one or more communication networks, such as the Internet, other wide area networks, local area networks, metropolitan area networks, and the like;
- an application server module 616 that is used for processing application requests. In some embodiments, the application server module 616 includes: an application master interface module 618 for interfacing with the application mater 150 (FIG. 1); a front-end interface module 626 for interfacing with the front-end 140 (FIG. 1); a data store interface module 630 for interfacing with the data structure(s) 180 (FIG. 1); a live process cache monitor and control 632 for managing application instances in the live process cache; an API interface module 642 for managing procedures for migrating an application from the application server system 160 to a separate application server; and checkpoint data set 656 including information regarding various API calls and answers;
- data 662, including local application library data 664, which includes identification information about the local applications available. When needed, data 662 includes user data 660, which may include data received from a requesting user (e.g., user name, passwords, user preferences, profiling information) and/or data produced or retrieved for the requesting user by the application server.

In some embodiments, the application master interface module 618 includes procedures 620 for adding and removing applications from the non-volatile storage of the application server.

In some embodiments, the front end interface module 626 includes procedures for handling application requests (Handle Request Module) 628 forwarded from the front end server 140.

In some embodiments, live process cache monitor and control 632 includes procedures (Load and Remove Application Instance Module) 634 for loading and removing application instances into the live process cache in accordance with application usage and available volatile memory, procedures (Execute Application Instance Module) 636 for executing application instances when processing application requests. The Execute Application Instance Module 636 may also include procedures (Resource Limit Enforcement) 638 for limiting resource consumption of a particular application. For example, an application that consumes more resources than a limit or threshold may be terminated (Terminate App Instance) 640. The resource limit may be a predefined amount or the threshold may vary depending on factors such as the number of requests for the application. For example, applications that receive higher numbers of requests may have a higher threshold before the application instance is terminated. Alternatively, the threshold may also depend on the amount of processing resources (e.g., one or more of: CPU time, "wall clock" time (e.g., total elapsed real time), memory, communication bandwidth, and number of system function calls made) consumed by the application. The threshold(s) may be applied per execution of an application, or to a running average of resources used over multiple executions of the application. An application instance that consumes resources above a corresponding threshold may be terminated.

In some embodiments, the API interface module 642 for managing procedures for migrating an application from the application server system 160 to a separate application server includes a variety of modules to perform various aspects of the migration. The API interface module 642 includes an API Call Status Module 644 which is used to determine whether an API call has been sent by a first application since a last checkpoint of the first application (in response to receiving a termination request for the first application). The API interface module 642 also includes a Waiting Period Determination Module 646 which determines whether to wait a waiting period for an answer to an outstanding API call, and also determines how long the waiting period, if any, will be. The API interface module 642 further includes an API Call Capture Module 648 which captures and does not send any new API calls received during a waiting period, and provides the captured and unsent API calls for a new checkpoint data set. The API interface module 642 also includes an API Call Termination Module 650 for terminating the outstanding API calls in accordance with the procedures/methods described with respect to FIGS. 2A and 2B. The API interface module 642 includes a New Checkpoint Determination Module 652 which determines when to take a new checkpoint and what data should be obtained in the new checkpoint data set (to be stored in checkpoint data sets 656). The API interface module 642 additionally includes an Application Migration Module 654 which migrates the application from the application server system to a separate application server using either a new data set (obtained by the New Checkpoint Determination Module) or the checkpoint data set associated with the last checkpoint, depending on the process determined and performed by the above described modules. Furthermore, the Application Migration Module 654 determines whether the data set used in the migration will be sent to a shared data store (e.g., 180, FIG. 1), the application master (e.g., 150, FIG. 1), or to another application server (e.g., 160-*n*, FIG. 1) depending on the embodiment employed.

Each of the above identified elements in FIG. 6 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Although FIGS. 4, 5, and 6 show an application master, a front end server, and an application server, respectively these figures are intended more as functional descriptions of the various features which may be present in a set of servers than as a structural schematic of the embodiments described herein. In practice, and as recognized by those of ordinary skill in the art, items shown separately could be combined and some items could be separated. For example, some items shown separately in FIG. 4, 5, or 6 could be implemented on single servers and single items could be implemented by one or more servers. The actual number of servers used to implement each such subsystem and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An application execution system having a plurality of application servers, wherein a first application server in the plurality of application servers comprises:
    one or more processors; and
    memory storing an application programming interface (API) interface module and an application to be executed by the one or more processors, wherein the application is checkpointed in checkpoint data sets on a recurring basis, the checkpoint data sets including a last checkpoint data set from a last checkpoint of the application, the last checkpoint data set including identity information for any terminated API calls captured in an immediately preceding checkpoint, any API call answers transmitted after the immediately preceding checkpoint, and any captured and unsent API calls transmitted after the immediately preceding checkpoint wherein:
    the API interface module comprises instructions for:
        receiving a termination request for the application;
        determining whether a first API call has been sent by the application since the last checkpoint; and
        when a first API call has not been sent since the last checkpoint, the API interface module further comprises instructions for:
            sending the last checkpoint data set to a second application server in the plurality of application servers.

2. The application execution system of claim 1, wherein the API interface module further comprises instructions for when a first API call has been sent by the application since the last checkpoint:
    processing the first API call;
    taking a new checkpoint of the application thereby obtaining a new checkpoint data set; and
    sending the new checkpoint data set to a second application server in the plurality of application servers;
    terminating or marking as pending a second API call when the second API call is outstanding since the last checkpoint; and
    recording in the new checkpoint data set identity information for the second API call.

3. The application execution system of claim 2, wherein the second API call is marked as pending and wherein the API interface module further comprises instructions for sending a reply to the second API call to the second application server at a time after the new checkpoint data set is sent to the second application server.

4. The application execution system of claim 1, wherein the first API call has been sent since the last checkpoint and wherein the API interface module further comprises instructions for:
    waiting a waiting period for an answer to a second API call when the second API call is outstanding since the last checkpoint; wherein
    when the answer has not been returned upon the completion of the waiting period:
        terminating or marking as pending the second API call; and
        recording in a new checkpoint data set identity information for the second API call; and
    when the answer has been returned upon the completion of the waiting period:
        recording the second API call answer in the new checkpoint data set.

5. The application execution system of claim 4, wherein the API interface module further comprises instructions for:
    during the waiting period, capturing and not sending a third API call; and
    upon the completion of the waiting period, recording the third API call in the new checkpoint data.

6. The application execution system of claim 1, wherein the termination request is from an application master.

7. The application execution system of claim 2, wherein the new check point data set includes an answer to the first API call.

8. The application execution system of claim 2 wherein the application is terminated on the first application server and wherein the second application server executes the application in a state the application was in upon termination on the first application server using:
   the new checkpoint data set when the new checkpoint data set is sent to the second application server, or
   the last checkpoint data set when the last checkpoint data set is sent to the second application server.

9. A method of operating an application server in a system having a plurality of application servers, the method comprising:
   on a first application server having one or more processors and memory storing an application programming interface (API) interface module and an application to be executed by the one or more processors, wherein the application is checkpointed in checkpoint data sets on a recurring basis, the checkpoint data sets including a last checkpoint data set, from a last checkpoint of the application, the last checkpoint data set including identity information for any terminated API calls captured in an immediately preceding checkpoint, any API call answers transmitted after the immediately preceding checkpoint, and any captured and unsent API calls transmitted after the immediately preceding checkpoint:
   receiving a termination request for the application;
   determining whether a first API call has been sent by the application since the last checkpoint; and
   when a first API call has not been sent since the last checkpoint:
      sending the last checkpoint data set to a second application server in the plurality of application servers.

10. The method of claim 9, the method further comprising:
   when a first API call has been sent by the application since the last checkpoint:
      processing the first API call;
      taking a new checkpoint of the application thereby obtaining a new checkpoint data set;
      sending the new checkpoint data set to a second application server in the plurality of application servers;
      terminating or marking as pending a second API call when the second API call is outstanding since the last checkpoint; and
      recording in the new checkpoint data set identity information for the second API call.

11. The method of claim 9, wherein the first API call has been sent since the last checkpoint, the method further comprising:
   waiting a waiting period for an answer to a second API call when the second API call is outstanding since the last checkpoint;
   when the answer has not been returned upon the completion of the waiting period:
      terminating or marking as pending the second API call; and
      recording in a new checkpoint data set identity information for the second API call; and
   when the answer has been returned upon the completion of the waiting period:
      recording the second API call answer in the new checkpoint data set.

12. The method of claim 11, further comprising:
   during the waiting period, capturing and not sending a third API call; and
   upon the completion of the waiting period, recording the captured and unsent third API call in the new checkpoint data.

13. The method of claim 9, wherein the termination request is received from an application master.

14. The method of claim 10, wherein the new check point data set includes an answer to the first API call.

15. The method of claim 9, the method further comprising sending the last checkpoint data set to a second application server in the plurality of application servers.

16. The method of any of claim 10, wherein the application is terminated on the first application server and wherein the second application server executes the application in a state the application was in upon termination on the first application server using:
   the new checkpoint data set when the new checkpoint data set is sent to the second application server or the last checkpoint data set when the last checkpoint data set is sent to the second application server.

17. A non-transitory computer readable storage medium storing an application programming interface (API) interface module and an application to be executed by one or more processors of a first application server in a system having a plurality of application servers, wherein the application is checkpointed in checkpoint data sets on a recurring basis, the checkpoint data sets including a last checkpoint data set from a last checkpoint of the application, the last checkpoint data set including identity information for any terminated API calls captured in an immediately preceding checkpoint, any API call answers transmitted after the immediately preceding checkpoint, and any captured and unsent API calls transmitted after the immediately preceding checkpoint, the API interface module comprising instructions for:
   receiving a termination request for the application;
   determining whether a first API call has been sent by the application since the last checkpoint; and:
   when a first API call has not been sent since the last checkpoint, the API interface module further comprises instructions for:
      sending the last checkpoint data set to a second application server in the plurality of application servers.

18. The non-transitory computer readable storage medium of claim 17, the API interface module further comprises instructions for when a first API call has been sent by the application since the last checkpoint:
   processing the first API call;
   taking a new checkpoint of the application in order to obtain a new checkpoint data set; and
   sending the new checkpoint data set to a second application server in the plurality of application servers;
   terminating or marking as pending a second API call when the second API call is outstanding since the last checkpoint; and
   recording in the new checkpoint data set identity information for the second API call.

19. The non-transitory computer readable storage medium of claim 17, wherein the first API call has been sent since the last checkpoint and wherein the API interface module further comprises instructions for:
   waiting a waiting period for an answer to a second API call when the second API call is outstanding since the last checkpoint; and
   when the answer has not been returned upon the completion of the waiting period:
      terminating the second API call; and
      recording in a new checkpoint data set identity information for the second API call; and
   when the answer has been returned upon the completion of the waiting period:

recording the second API call answer in the new checkpoint data set.

20. The non-transitory computer readable storage medium of claim 19, wherein the application is terminated on the first application server and wherein the second application server executes the application in a state the application was in upon termination on the first application server using:
- the new checkpoint data set when the new checkpoint data set is sent to the second application server or
- the last checkpoint data set when the last checkpoint data set is sent to the second application server.

* * * * *